(12) United States Patent
Mere (10) Patent No.: US 10,535,274 B2
(45) Date of Patent: Jan. 14, 2020

(54) SYSTEM AND METHOD FOR COLLISION AVOIDANCE

(71) Applicant: Airbus Operations S.A.S., Toulouse (FR)

(72) Inventor: Jean-Claude Mere, Verfeil (FR)

(73) Assignee: Airbus Operations S.A.S. (FR)

(*) Notice: Subject to any disclaimer, the term of this patent is extended or adjusted under 35 U.S.C. 154(b) by 203 days.

(21) Appl. No.: 15/668,038

(22) Filed: Aug. 3, 2017

(65) Prior Publication Data

US 2019/0043374 A1  Feb. 7, 2019

(51) Int. Cl.
*G08G 5/04* (2006.01)
*G08G 5/00* (2006.01)

(52) U.S. Cl.
CPC .......... *G08G 5/045* (2013.01); *G08G 5/0039* (2013.01); *G08G 5/0047* (2013.01); *G08G 5/0078* (2013.01)

(58) Field of Classification Search
USPC ........................................................ 701/301
See application file for complete search history.

(56) References Cited

U.S. PATENT DOCUMENTS

| | | | | |
|---|---|---|---|---|
| 6,525,674 B1* | 2/2003 | Kelly | ..................... | G01C 5/005 340/961 |
| 2003/0182060 A1* | 9/2003 | Young | ................. | G08G 5/0056 701/301 |
| 2004/0044445 A1* | 3/2004 | Burdon | .................. | G01C 23/00 701/3 |
| 2006/0052912 A1* | 3/2006 | Meunier | .............. | G08G 5/0086 701/10 |
| 2007/0050101 A1* | 3/2007 | Sacle | .................. | B64D 45/0015 701/11 |
| 2013/0080043 A1* | 3/2013 | Ballin | .................. | G08G 5/0034 701/120 |
| 2015/0134153 A1* | 5/2015 | Coulmeau | ................ | G05D 1/00 701/3 |
| 2016/0314692 A1* | 10/2016 | Bahrami | .................. | G08G 5/04 |
| 2019/0043374 A1* | 2/2019 | Mere | ...................... | G08G 5/045 |

* cited by examiner

*Primary Examiner* — Tyler D Paige
(74) *Attorney, Agent, or Firm* — Lerner, David, Littenberg, Krumholz & Mentlik, LLP (57) ABSTRACT

In operating an aircraft, a situation is displayed at each instant representing a spatio-temporal overview of risk zones around the aircraft. Each direction in space around the aircraft is scanned, and a simulated displacement of the aircraft in each direction is analyzed so as to identify potential zones of interference with the aircraft's path. Anticipated movement of risk zones over a planned time duration of a flight is determined. Such anticipated movement is correlated with an anticipation position of the aircraft over the planned time duration. Accordingly, risk zones initially appearing as a potential hazard may be determined to be safe by the time the aircraft reaches them, and vice versa. Such information is presented to pilots at an outset of the flight and continuously updated throughout the flight, enabling accurate and safe evaluation and strategy decisions.

21 Claims, 12 Drawing Sheets

SYSTEM AND METHOD FOR COLLISION AVOIDANCE

BACKGROUND

Current navigation screens traditionally present an instantaneous image of information, such as weather, traffic collision avoidance system (TCAS) blips, etc., collected by an aircraft. To evaluate a risk of interference with a current trajectory of the aircraft, a crew of the aircraft must analyse an evolution of a situation presented on their navigation screens over several time samples. If the crew's analysis leads them to think that there is actually a risk of interference, the crew must then determine how to alter the trajectory of the aircraft to avoid the interference. If the interference is a weather situation, that generally evolves slowly in comparison to the speed of the aircraft, the crew may have enough time to determine an appropriate alternate route. However, if the interference is one or more other aircraft that are moving at the same speed or more rapidly than the aircraft, it becomes very complicated to anticipate the temporal evolution of the situation based only on a spatial representation at a given instant of the threats around the aircraft.

BRIEF SUMMARY

One aspect of the technology provides an aircraft collision avoidance system, comprising a display, one or more inputs adapted to receive interference information, a memory storing an initial flight plan, the initial flight plan including a flight path and an associated time period, and one or more processors in communication with the display. The one or more processors may be configured to receive interference information from one or more information systems, the interference information identifying objects between an aircraft and its destination, to determine a position of each of the identified objects at a first time, to determine a geometry of each of the objects between the aircraft and its destination, and to determine a speed and displacement of each of the objects. The one or more processor may further be configured to compute a predicted position of each object at a second time later than the first time based on the determined geometry, speed, and displacement, wherein the second time corresponds to a time when the aircraft is expected to be at a particular position along the initial flight path, and to output to the display an indication of the predicted position of each object at the second time.

Another aspect of the technology provides a method for avoiding collision of an aircraft, the method comprising storing an initial flight plan, the initial flight plan including a flight path and an associated time period, receiving interference information from one or more information systems, the interference information identifying objects between the aircraft and its destination, and determining, with one or more processors, a position of each of the identified objects at a first time. The method further includes determining, with the one or more processors, a geometry of each of the objects between the aircraft and its destination, determining, with the one or more processors, a speed and displacement of each of the objects, and computing, with the one or more processors, a predicted position of each object at a second time later than the first time based on the determined geometry, speed, and displacement, wherein the second time corresponds to a time when the aircraft is expected to be at a particular position along the initial flight path. The predicted position of each object at the second time is displayed to a user, with a particular display mode being selectable between a current view of a situation surrounding the aircraft, the predicted positions of the objects relative to the aircraft, or a combination of both.

DETAILED DESCRIPTION

In operating an aircraft, a situation displayed at each instant represents a spatio-temporal overview of risk zones around the aircraft. It is constructed by scanning each direction in space and by simulating a fictitious displacement of the aircraft in each direction so as to identify the zones of collision with the dynamic environment of the aircraft. Thus, whatever direction is followed by the aircraft, the situation that it will encounter will be that presented on the screen. The situation displayed will evolve constantly as a function of time in the other directions, but while remaining directly usable at each instant to identify, in a dependable manner, the directions to be considered by priority for an avoidance. The information is displayed to a flight crew in such a way that it can be readily understood and evaluated without guesswork, thus facilitating their analysis of the situation and their decision-making in the event of a predicted conflict. At each instant, the situation which is presented to the flight crew allows them to identify the directions in space that they can take to avoid any collision with the environment. If they alter their route in order to follow a direction without risk zones, this direction will remain collision free over the time horizon corresponding to the display range selected on the screen. In addition to facilitating strategy decisions during critical instances of the flight, a safety of the aircraft is increased by providing early anticipation of potential hazards.

Figure 1:
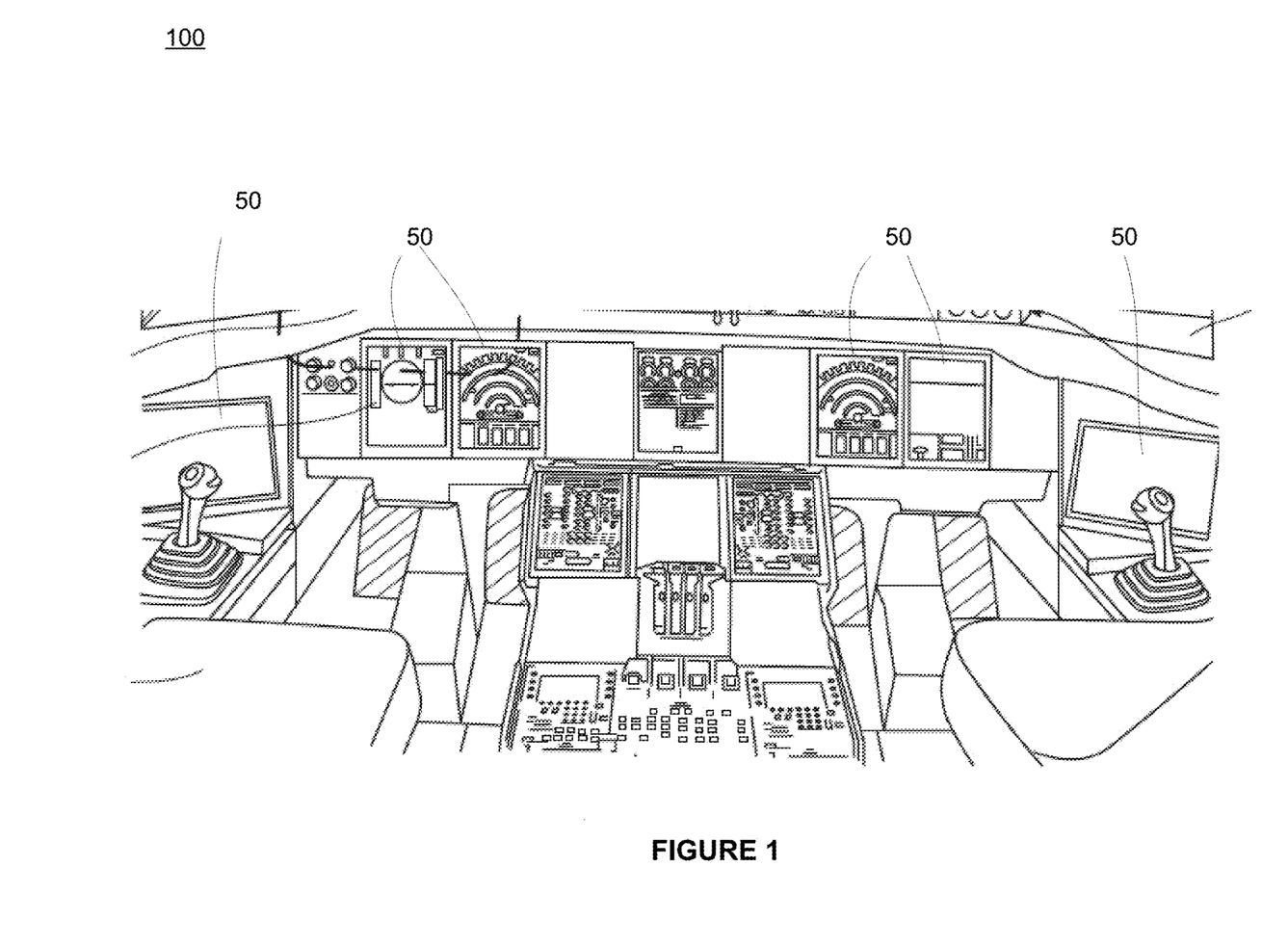
FIG. 1 is a perspective view of a system in accordance with an aspect of the disclosure implemented within a cockpit of an airplane.

FIG. 1 provides an example of a cockpit 100, including a plurality of information displays 50. The displays may be used to depict various flight information, and one or more of the displays may indicate a flight path. The flight path display may identify zones or objects to be avoided, such as weather conditions, other aircrafts, or the like. According to the present disclosure, such displays may include a depiction of how such objects will move over the course of the flight. For example, one or more computing devices receive information from one or more reporting services regarding objects that will potentially interfere or collide with the aircraft. The one or more computing devices determine how such objects will move over the course of the flight, and provide a graphical representation of such movement to a pilot on one or more of the displays.

In some instances, such objects will move out of or into the flight path. The displays depicting movement of the objects may be continually updated as the aircraft continues along an initial path or changes path. As shown, the displays 50 may be arranged among other aviation controls, such as on a dashboard below a windshield, in a console, side panel, seat attachment, or the like. In this regard, the pilot may easily access the interference information while maintaining control of the aircraft.

Figure 2:
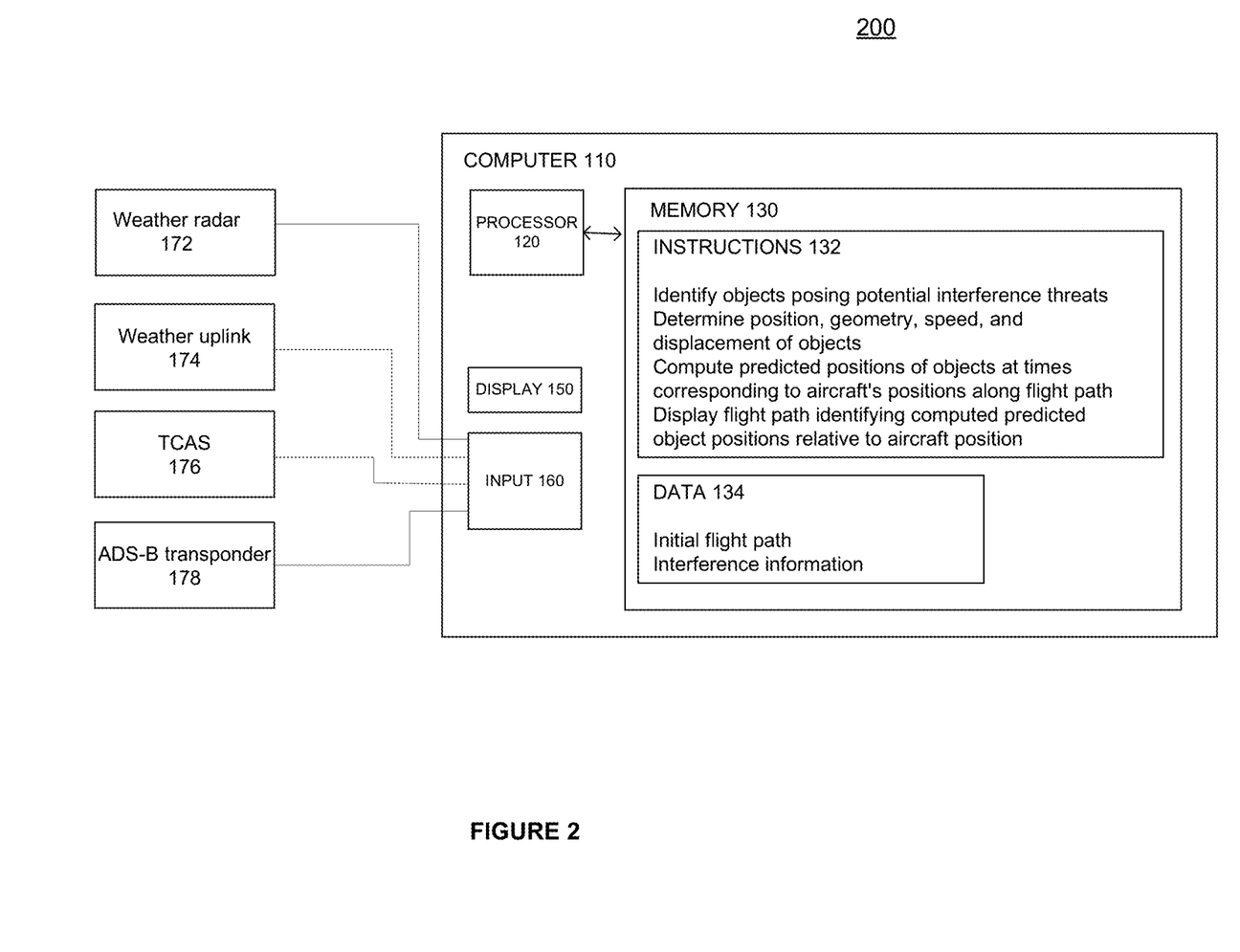
FIG. 2 is a block diagram of an example system according to aspects of the disclosure.

As shown in FIG. 2, a system 200 in accordance with one aspect of the invention includes the computer 110 containing a processor 120, memory 130, display 150, input 160, and components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, NVRAM, DVD or other optical disks, as well as other write-capable and read-only memories. In that regard, memory may include short term or temporary storage as well as long term or persistent storage. Systems and methods in accordance with aspects of the invention may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" are used interchangeably herein. The instructions may be stored in object code format for direct processing by the processor, or in any other computer language including scripts or collections of independent source code modules that are interpreted on demand or compiled in advance. Functions, methods and routines of the instructions relate to operation of a collision avoidance system. For example, the instructions 132 may provide for identifying objects posing a potential threat of interference or collision, determining a position, geometry, speed, and displacement of each identified object, and computing predicted position of the objects at time corresponding to the aircraft's positions along a flight path. The flight path may be displayed illustrating the computed predicted object positions relative to the aircraft position. In some examples, the flight path may be updated to avoid collision.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data is also formatted in any computer-readable format.

By further way of example only, image data is stored as bitmaps comprised of grids of pixels that are stored in accordance with formats that are compressed or uncompressed, lossless or lossy, and bitmap or vector-based, as well as computer instructions for drawing graphics. The data comprise any information sufficient to identify the relevant information, such as numbers, descriptive text, proprietary codes, references to data stored in other areas of the same memory or different memories (including other network locations) or information that is used by a function to calculate the relevant data. Examples of such data include an initial flight path and interference information, such as that obtained from interference information sources 172, 174, 176, 178.

The processor 120 may be a conventional processor or a dedicated controller such as an ASIC. Although FIG. 2 functionally illustrates the processor and memory as being within the same block, it will be understood by those of ordinary skill in the art that the processor and memory may actually comprise multiple processors and memories that are or are not stored within the same physical housing. For example, memory may be a hard drive or other storage media located in a server farm of a data center. Accordingly, references to a processor, a computer, or a memory will be understood to include references to a collection of processors, computers, or memories that operate in parallel, in sequence, or independently.

The computer 110 may be any type of computing device, such as an integrated aircraft system controller, laptop, notebook, tablet, handheld, or other computer. The computer 110 also includes an electronic display 150 (e.g., a monitor having a screen, a touch-screen, a projector, a television, a computer printer or any other electrical device that is operable to display information), and end user input 160 (e.g., a mouse, keyboard, touch-screen, microphone, or any other input device).

In some examples, the computer 110 may be communicatively coupled to an avionics system of the aircraft. In this regard, the computer 110 may receive flight information from the avionics system, such as information relating to fuel level, navigation, distance traveled, time, speed, altitude, orientation (pitch, yaw, roll), or the like.

The computer 110 may also be communicatively coupled to other nodes, for example, through a network. For example, the computer 110 may receive input from interference information sources 172-178. Such sources may include, for example, weather radar 172, weather uplink 174, Traffic Collision Avoidance System (TCAS) 176, automatic dependent surveillance-broadcast (ADS-B) 178, or any of a number of other resources providing information regarding potential objects or other hazards in a flight path of the aircraft.

The interference information sources 172-178 may communicate with the computer 110 using various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Alternatively or additionally, the communication may occur over datalink, radio, satellite, or any other communication means typically used by aircrafts. Information from the interference information sources 172-178 may be temporarily stored, such as in memory 130. In some examples, the information may be cross-consolidated. By way of example only, weather radar information may be compared with datalink information. Where the information matches, it may be stored only once, potentially with an associated weight or confidence value indicating a likely accuracy of the information. Information that does not match may be not store, or may be stored in association with a lower confidence value.

Figure 3:
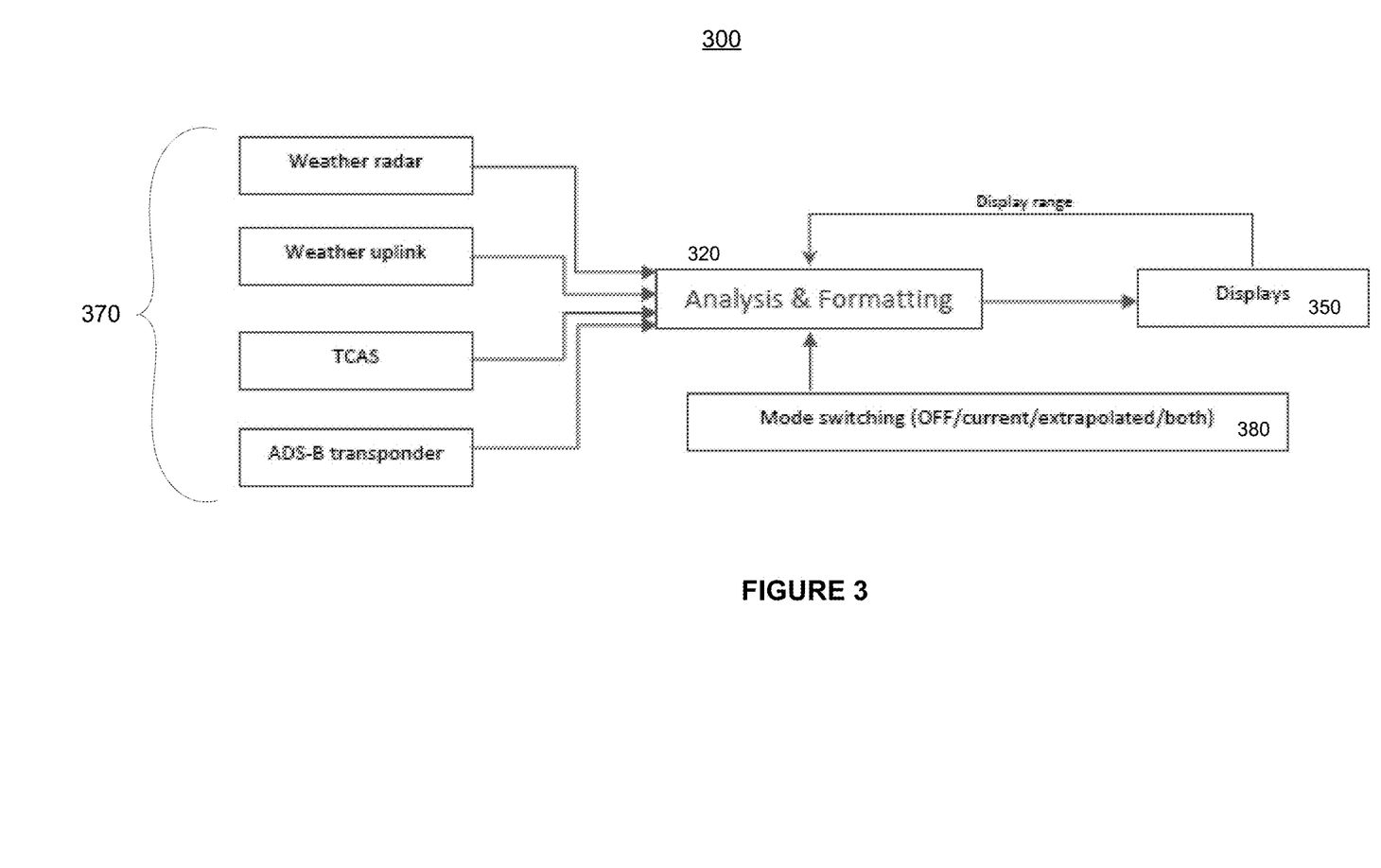
FIG. 3 is a block diagram of another example system according to another embodiment.

FIG. 3 illustrates a collision avoidance system 300 according to another example. It should be understood that features and components of the system 300 may be incorporated into the system 200 of FIG. 2, and vice versa. As shown in FIG. 3, the system 300 includes an analysis and formatting engine 320 in communication with one or more displays 350 and a mode switching unit 380.

The analysis and formatting engine 320 may be a computing device, or a module executable on a computing device, configured to receive input from various sources and to generate a flight plan indicating expected positions and orientations of objects and other hazardous conditions at particular times when the aircraft is expected to be within range of those objects or conditions. For example, the analysis and formatting engine 320 receives input from interference information sources 370, and uses such input along with other information to compute a position and orientation of objects at a future time corresponding to when the aircraft will be at a corresponding position. Such other information may include, for example, speed, altitude, position, heading, and other information related to the aircraft. Such information may be input manually or may be automatically detected. For example, one or more sensors configured to detect the speed, altitude, position, heading, etc. may automatically provide such information to the analysis and formatting engine. In other examples, such information may be available from aeronautics systems interconnected with the analysis and formatting engine 320.

The analysis and formatting engine 320 also receives input regarding a display range from the one or more displays 350. The display range may indicate an area of travel being depicted on the displays 350 at a given time. Where multiple displays 350 are used, multiple display ranges may be provided to the analysis and formatting engine 320. By way of example only, a first display may depict an area of travel a few miles ahead of the aircraft, while a second display may depict a more extended area of travel, such as an entire flight path. In this regard, the analysis and formatting 320 may continuously update the one or more displays 350 based on movement of the aircraft, movement of the objects, etc. As such, pilots may continually be provided with an updated view of their immediate surroundings and potential obstacles ahead, allowing for a more accurate and safer evaluation of the potential hazard and whether to alter the flight plan.

Mode switching input 380 may allow for variation in the output displayed on the one or more displays 350. For example, the system 300 may be switched among various modes, such as an "off" mode, "current" mode, "extrapolated" mode, and "both" mode. In the "off" mode, the displays 350 may not depict the objects potentially interfering with the flight plan. In "current" mode, the display may for example indicate a current position of the aircraft and a current position of objects in the flight path. However, such objects may move over the course of the flight, as explained further in the examples below, sometimes moving into or out of the flight path. Accordingly, the "extrapolated" mode may indicate an anticipated position of the objects at a time the aircraft will be at a corresponding position along the flight path. For example, if an object is present 300 miles ahead of the aircraft, the "extrapolated" mode may indicate an anticipated position of the object at a time it would take the aircraft to travel 300 miles. In "both" mode, both the current and extrapolated positions of the objects may be illustrated, such as on a divided screen, on multiple screens, or on a common screen using different indicia. In some examples, the analysis and formatting engine 320 may continue computing expected positions even in the "off" mode, but not output such positions to the display. In this regard, if the mode switching unit 380 is switched to a different mode, the computed information is readily accessible, thus reducing latency. Accordingly, the pilot can more readily assess the situation and take appropriate action. Reducing such latency can be critical in situations where potentially interfering objects are within close range of the aircraft.

FIGS. 4A-D illustrate an example of objects moving in relation to a flight path as a time corresponding to travel of the flight path passes. Each of FIGS. 4A-4D may be presented to a user, such as a pilot, as a "current" view of a flight path. As will be seen, the view continually changes as the aircraft progresses along the path.

Figure 4A:
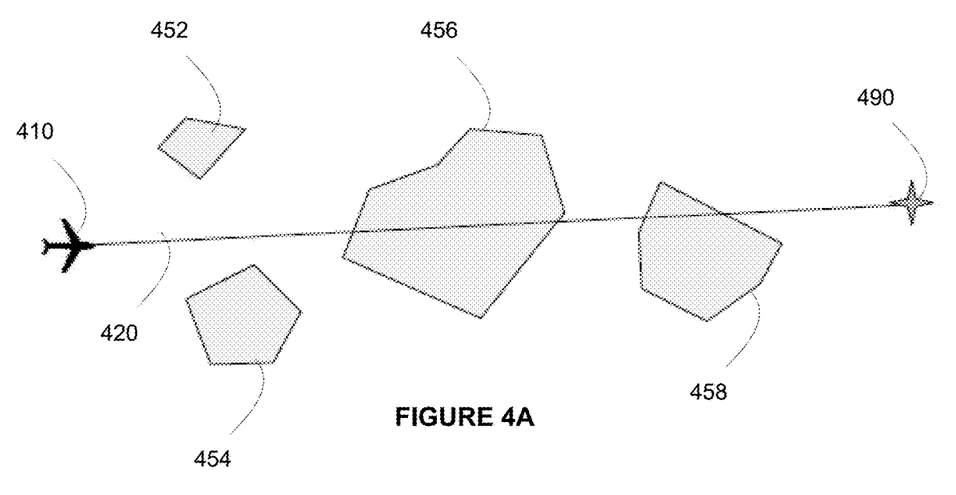
FIGS. 4A-D illustrate an example of objects moving in relation to a flight path as a time corresponding to travel of the flight path passes.

FIG. 4A illustrates a flight path 420 at a first time, when aircraft 410 is at a first position, such as at a beginning point of the flight. At the first time, a number of obstacles 452, 454, 456, 458 exist between the aircraft 410 and its destination 490. The obstacles 452-458 may be, for example, other aerial vehicles (e.g., airplanes, helicopters, blimps, balloons, etc.), objects (e.g., satellites, etc.), weather conditions (e.g., storm clouds, etc.), or any other object or condition that may present a potentially hazardous condition to the aircraft 410. In some instances, such as for weather conditions, the obstacle may be a zone or area defined by a plurality of vertices. Such a display may suggest to a pilot that the flight path 420 needs to be altered to avoid the obstacles 452-458. However, as the obstacles 452-458 may move over the course of the flight, such alteration is not always necessary.

Figure 4B:
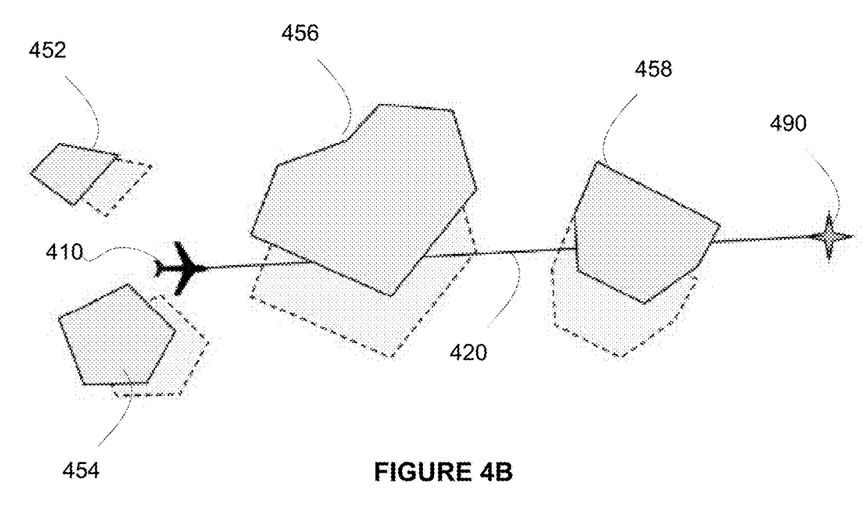

FIG. 4B illustrates the flight path 420 at a second time, where the aircraft 410 is at a second position. As shown, the obstacles 452-458 have each moved. Obstacle 456 in particular has moved significantly out of the flight path 420.

Figure 4C:
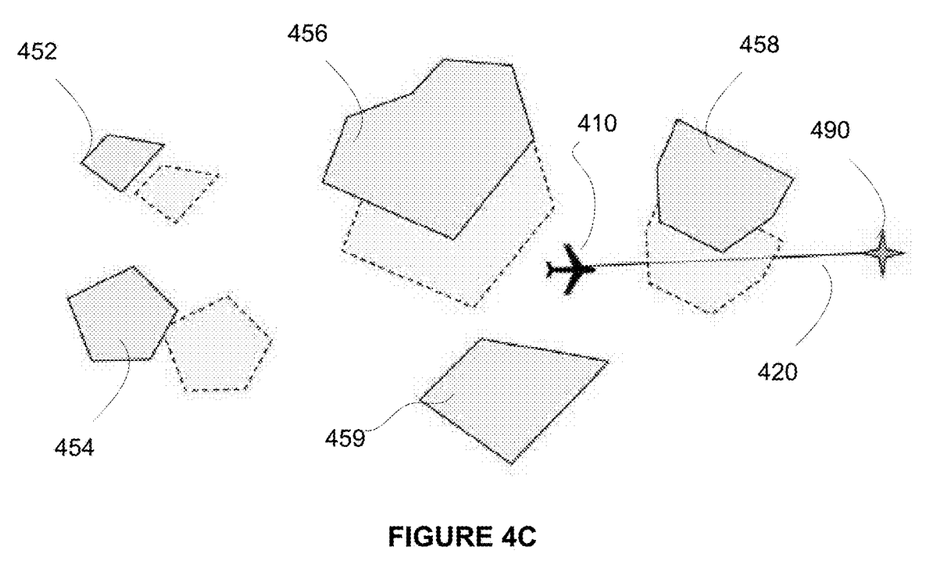

FIG. 4C illustrates the flight path 420 at a third time, where the aircraft 410 is at a third position. As shown, the obstacle 456 has moved completely out of the flight path by the time the aircraft 410 was at a corresponding position. Moreover, obstacle 458 has also moved completely out of the flight path 420. Additionally, obstacle 459 has entered into view, but does not appear to pose a threat of interfering with the flight path 420.

Figure 4D:
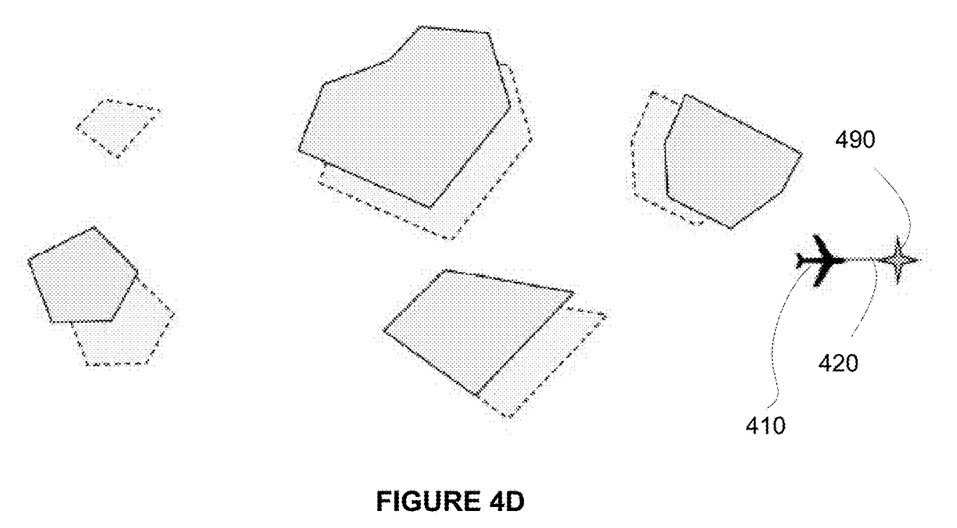

FIG. 4D illustrates the flight path 420 at a fourth time, when the aircraft 410 is approaching its destination 490. Because the obstacles 452-459 continued to move over the course of the flight, they moved from an initial position that was within the flight path to positions that were clear of the flight path by the time the aircraft 410 was approaching positions corresponding to the obstacles. For example, by the time the aircraft 410 was approaching the initial positions of the obstacles 452-458, the obstacles 452-458 has moved. Accordingly, it was not necessary for the aircraft 410 to alter its flight plan 420 after all.

Figure 5:
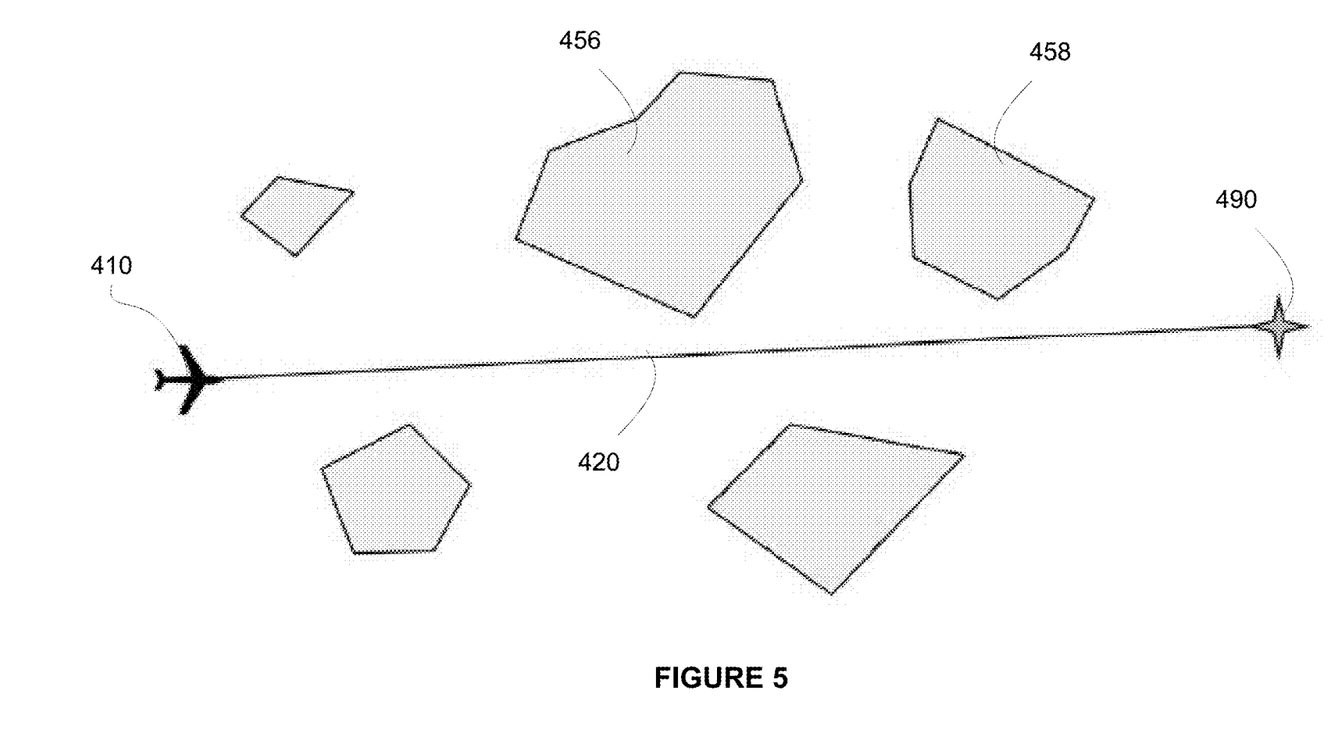
FIG. 5 illustrates an example view of a flight path based on a predicted movement of the objects of FIGS. 4A-D.

FIG. 5 illustrates an example view of a flight path based on a predicted movement of the obstacles of FIGS. 4A-D. Such view may be presented to a user as an "extrapolated" view, enabling the user to foresee predicted positions of the obstacles at times relevant to the aircraft's position along the flight path. For example, whereas the obstacle 456 was initially directed in the flight path 420 at the first time illustrated in FIG. 4A, it had moved to the position shown in FIG. 5 by the time the aircraft 410 was at a corresponding location along the flight path 420. Similarly, while obstacle 458 was also within the flight path 420 at the first time (FIG. 4A) and the second time (FIG. 4B), it had cleared the flight path by the time the aircraft 410 was approaching a corresponding position. Accordingly, in the extrapolated view of FIG. 5, the obstacles 456 and 458 are shown as being clear of the flight path 420. In this way, the user is presented with a clearer illustration of how the obstacles 456, 458 will impact the flight plan. Therefore, as opposed to changing the flight plan, such as by changing speed, direction, etc. as the user may have been prompted to do when presented with the current view of FIG. 4A, the user can be assured that maintaining the flight plan is safe when presented with the extrapolated view of FIG. 5.

If the speed of displacement of the obstacles is significant, the display will be different from what a flight crew might see through a window at a given instant. However, the extrapolated view will allow them to see what direction to follow instantaneously in order to avoid the obstacles. For a better understanding and evaluation by the crew of a situation, and so as not to be disturbed by the difference in representation in relation to the outside situation, the flight crew may be presented with an option of how to display the information. For example, a pilot may choose from a current display displaying the actual real-time state of the surrounding situation alone, an extrapolated display displaying predicted positions of the obstacles at a time the aircraft will reach them, or a combination of both simultaneously. Using the combination view, the crew is able to properly correlate the two representations, for example through a specific colour code or through a particular type of representation, allowing them at one and the same time to discriminate the zones in the two different situations and also to properly understand the temporal relationship between the two. According to some examples, the different views may be available for display as layers. Thus, for example, a user could display the extrapolated view as a layer superimposed over other information, such as the current view, a map, etc.

Figure 6A:
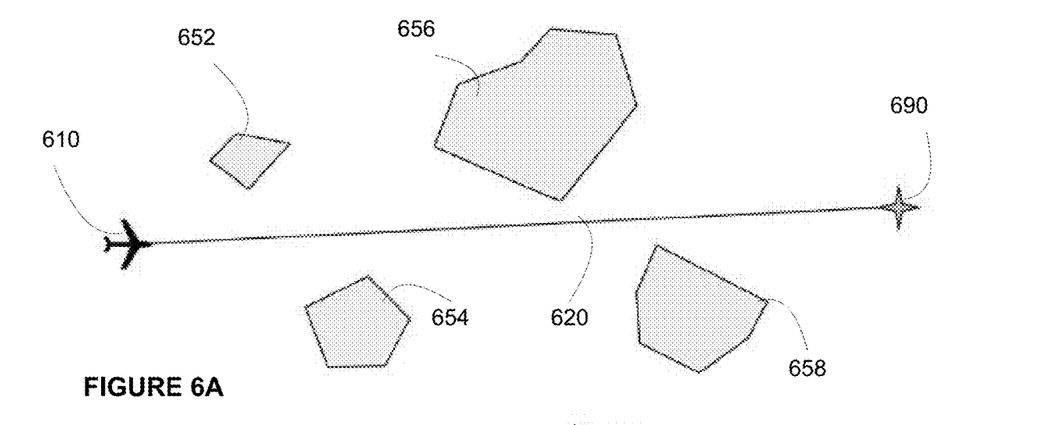
FIGS. 6A-C illustrate another example of objects moving in relation to a flight path as a time corresponding to travel of the flight path passes.
Figure 6B:
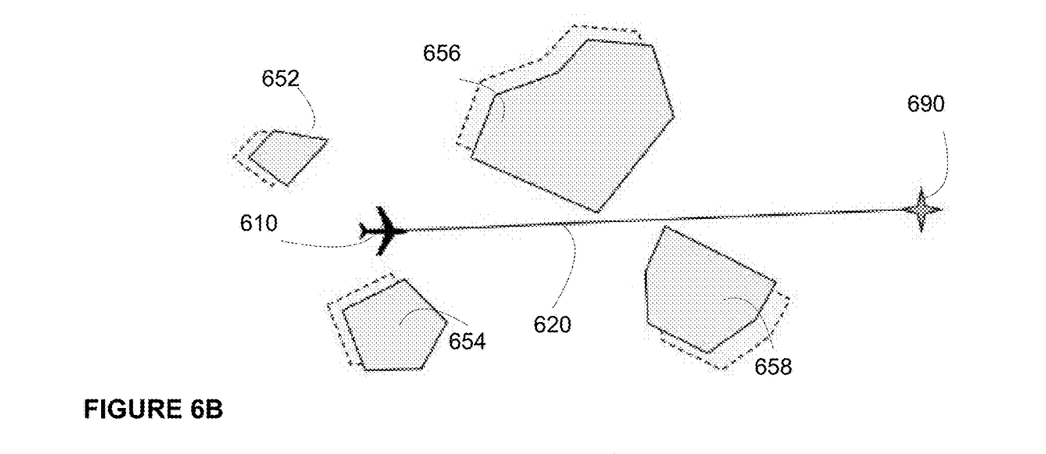
Figure 6C:
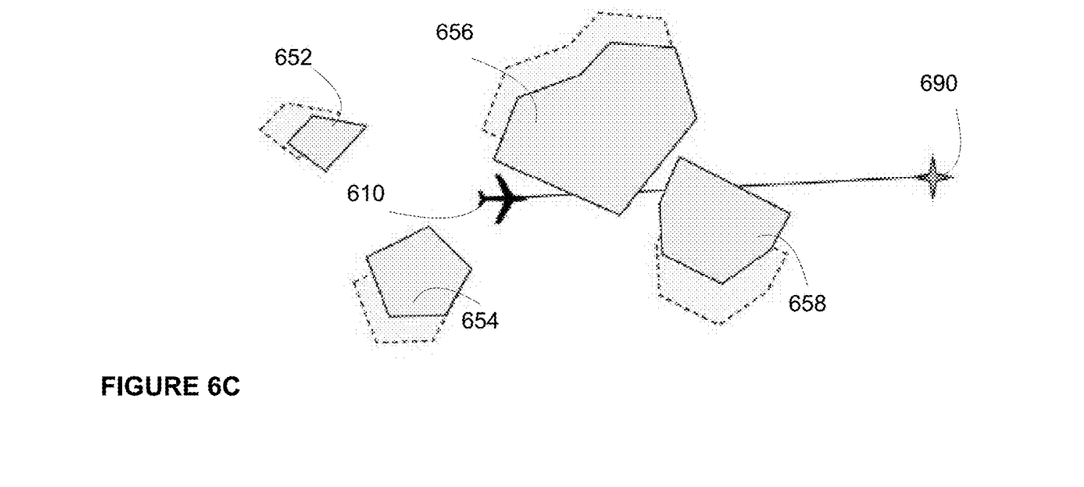

FIGS. 6A-C illustrate another example of objects moving in relation to a flight path 620 as a time passes corresponding to travel of an aircraft 610 along the flight path 620. In this example, however, the objects move from an initial position outside of the flight path 620 to a position within the flight path 620 by the time the aircraft 610 reaches the relevant position.

FIG. 6A illustrates the flight path 620 at a first time when the aircraft 610 is at a first position, such as a beginning point of the flight. At this first time, objects 652-658 are not within the flight path 620. Accordingly, such a current view may lead a user to believe that the aircraft 610 can safely reach its destination 690 without changing course. However, as shown in FIG. 6B, the objects 652-658 are moving over time, potentially in different directions from one another. For example, while the object 652 appear to be moving East or to the right, the object 656 is moving South or down, and the object 658 is moving Northwest or up and to the left. As such, by a second time when the aircraft 610 is at a second position along the flight path 620, the objects 656 and 658 are moving towards the flight path 620 and appearing to cause a risk of collision. By a third time illustrated in FIG. 6C, when the aircraft 610 is at a third position, the objects 656 and 658 have moved completely into the flight path 620, thus presenting a risk of collision. While the initial current view of FIG. 6A suggested that the flight path 620 was clear, the updated current view of FIG. 6C indicated otherwise.

Figure 7:
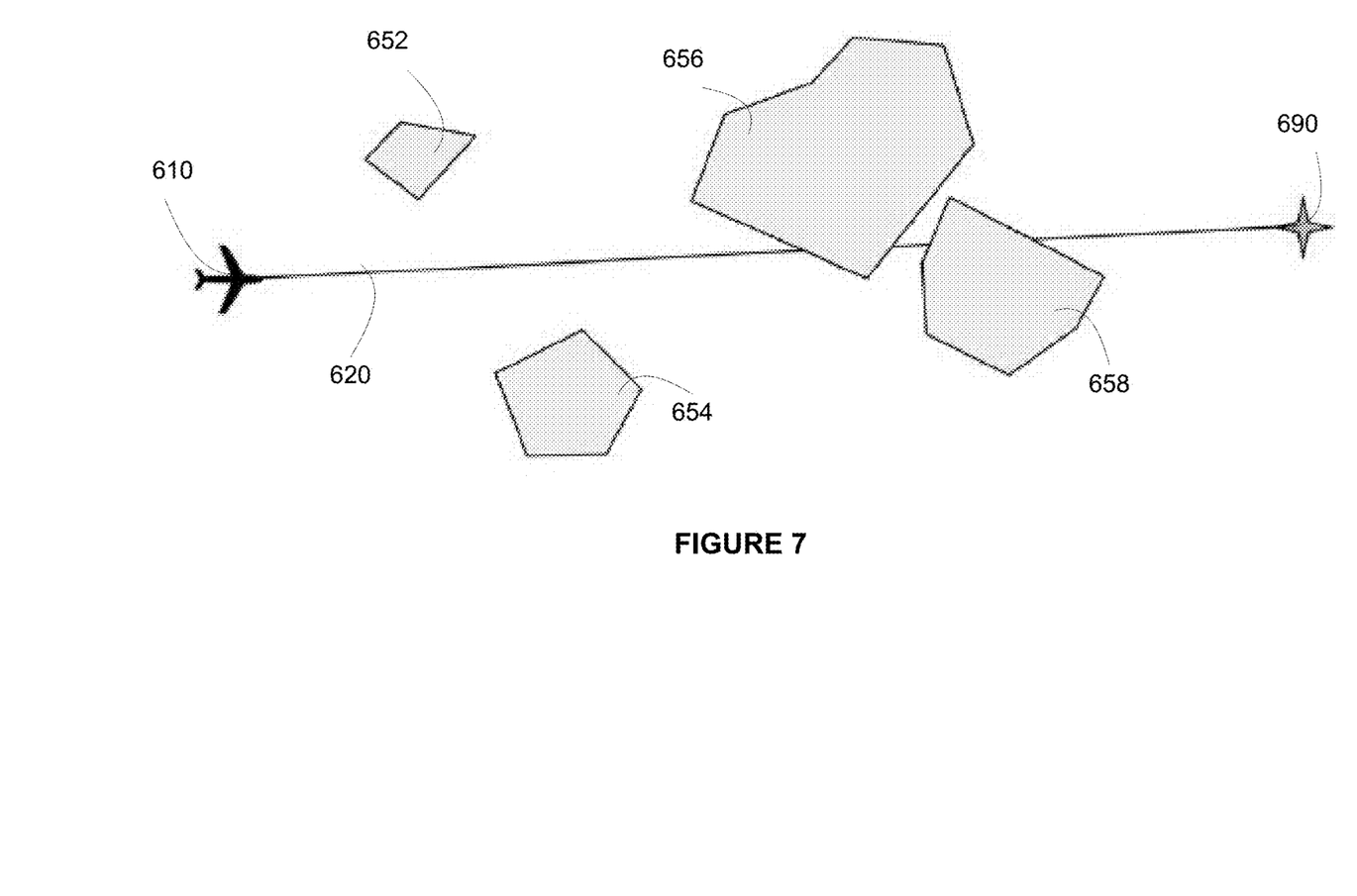
FIG. 7 illustrates another example view of a flight path based on a predicted movement of the objects of FIGS. 6A-C.

FIG. 7 illustrates another example of an extrapolated view of the flight path 620 and objects 652-658 of FIGS. 6A-C.

At the outset, each of the objects 652-658 is shown at a position where it is expected to be at a time when the aircraft 610 reaches a corresponding position along the flight path 620. Such view makes it possible for the user to identify a likely hazard from the very first instant.

Figure 8:
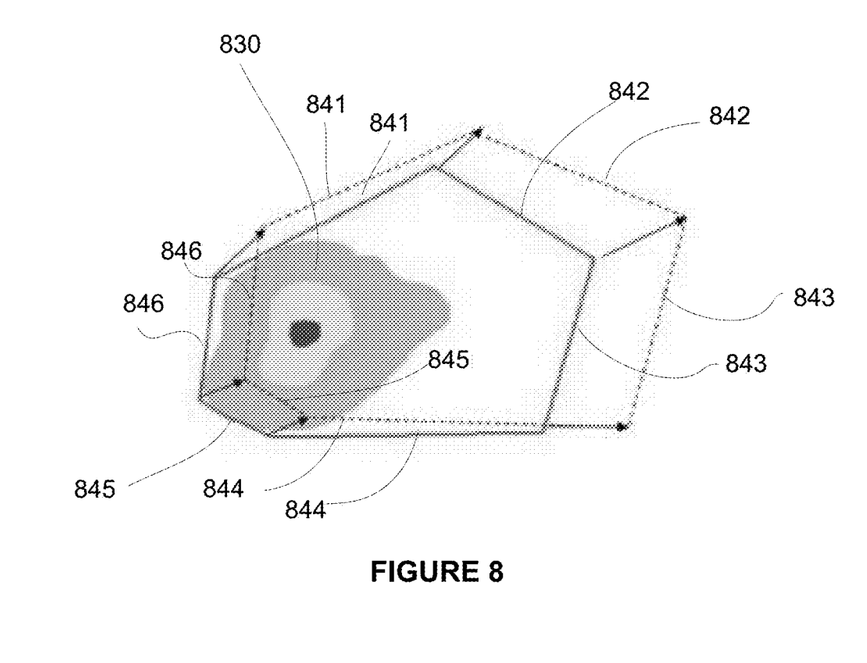
FIG. 8 illustrates an example of vertex displacement according to aspects of the disclosure.

FIG. 8 illustrates an example of a potential interference zone and its predicted movement. In this example, the potential interference is a weather condition 830, varying in intensity from a most severe area at a center to a less severe area near its perimeter. To facilitate computation of the predicted movement, the condition 830 may be more concretely defined by a plurality of vertices 841-846. The vertices 842, 843 may be further from a perimeter of the weather condition 830 on a side which includes a direction of movement of the condition 830 to account for uncertainties in the displacement/deformation velocities of the condition 830. For example, a margin is taken in front of the condition 830 in case it moves faster than what has been calculated or received from information systems.

As the perimeter of the condition 830 may change, the plurality of vertices 841-846 may be updated from a first point in time to a new position at a second point in time to maintain consistency with the size and shape of the condition 830. Moreover, the condition 830 may move positions over time. A speed and displacement of the condition may be measured. For example, a temporal evolution of the condition 830 may be analyzed to derive a speed vector of the various vertices 841-846. Using the speed vectors, a displacement and deformation of the condition 830 as a function of time is extrapolated on the basis of the position and current speed of the vertices. The extrapolation may occur over a time horizon corresponding to a ratio between a range of the display screen and a current speed of the aircraft. The vertices 841-846 may be updated from a first position at a first time to a second position at a second time, indicated by updated vertices 841'-846'. For example, the speed and displacement of the vertices 841-845 may be used to compute a trajectory of the condition 830, and enables computation of a predicted position and orientation of the vertices at a second point in time later than the first point in time, the predicted position indicated by vertices 841'-846'.

Figure 9A:
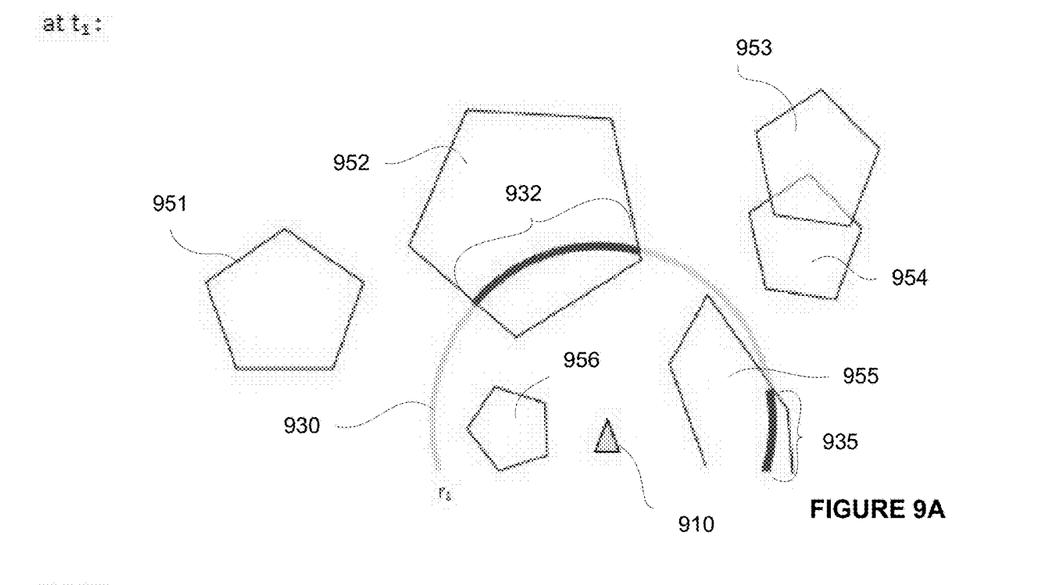
FIGS. 9A-B illustrate an extrapolation of objects to be avoided at a first time and a second time, respectively.

FIGS. 9A-B illustrate an extrapolation of objects to be avoided at a first time and a second time, respectively. As shown in FIG. 9A, a circle 930 of a given radius r1 is centered around an aircraft 910 at a first time t1. The radius may be calculated as (V× t), wherein V is a current speed of the aircraft 910 and t is an instant in time. Thus, for example, r1=V× t1. Potential interferences 951-956, such as clouds or other objects or conditions, are defined by a geometry made up of a number of vertices. An intersection of the circle 930 with the geometry of the potential interferences 951-956 is identified. For example, subsections 932 of the circle 930 intersecting with the potential interference 952 is identified, and subsection 935 of the circle 930 intersecting with the potential interference 955 is identified. Once identified, the subsection may be noted, such as by being stored in a buffer.

Figure 9B:
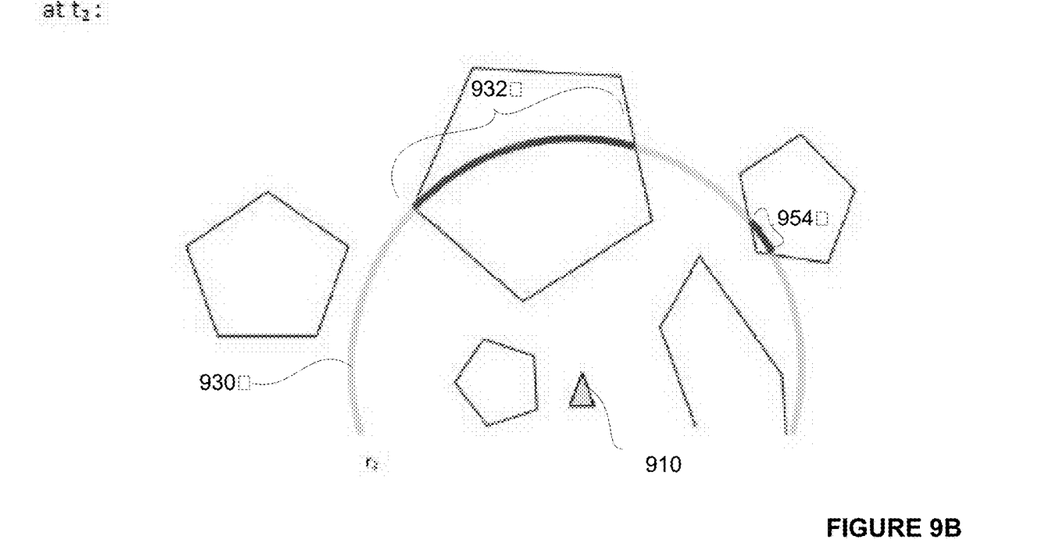

FIG. 9B represents an extrapolation for a second later time t2. The speed V of the aircraft 910 may remain relatively the same. Accordingly, radius r2 of circle 930', calculated as r2=V× t2, is greater than radius r1. As such and because interferences 951-956 have moved/evolved between t1 and t2, the circle 930' will intersect with different portions of the potential interferences 951-956. Second intersections 932' and 954' are therefore identified. The radius of the circle may be varied continuously from 0 to a value corresponding to a range R of the display, and a sum of the subsections of the circle intersecting with the interferences is computed. According to some examples, the display range may be selected and varied by a user. By varying the time continuously from 0 to R/V, or by varying r continuously from 0 to R, a display equal to the sum of the subsections over the display range is obtained, which integrates the position/shape of the potential inteferences at the instant at which the aircraft would intercept them if it travelled straight in the direction of the interception.

Figure 10:
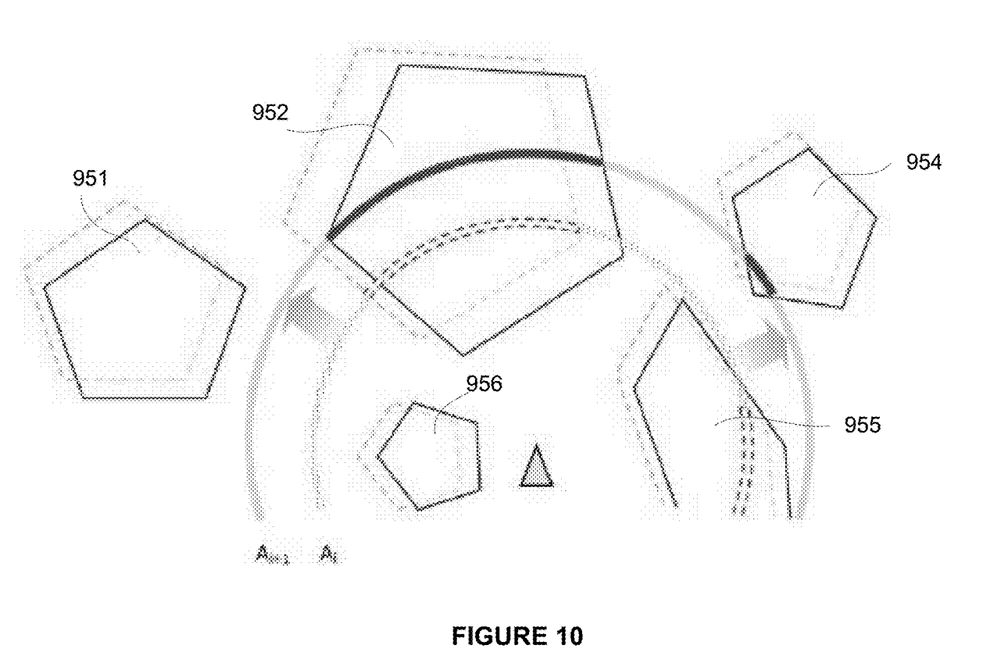
FIG. 10 provides another example illustration of the extrapolation of FIGS. 9A-B.

FIG. 10 illustrates an example of the summation of the subsections of circles of varying radii intersecting with the potential interferences. The image is constructed by:

(1) varying the radius $r_i$ of the circles $A_i$, the increment of radius $dr_i$ corresponding to a time increment $dt=t_{i+1}-t_i=(r_{i+1}-r_i)/V$, V being the speed of the aircraft;

(2) extrapolating the new position and shape of the potential interferences 951-956 at $t_i+dt$;

(3) retaining from the potential interferences to be avoided, for construction of a final image, only their intersection at instant $t_i+dt$ with the arc $A_{i+1}$ of radius $r_{i+1}$;

(4) representing on the screen the set of intersections thus obtained for each elementary circle on the same view.

Figure 11:
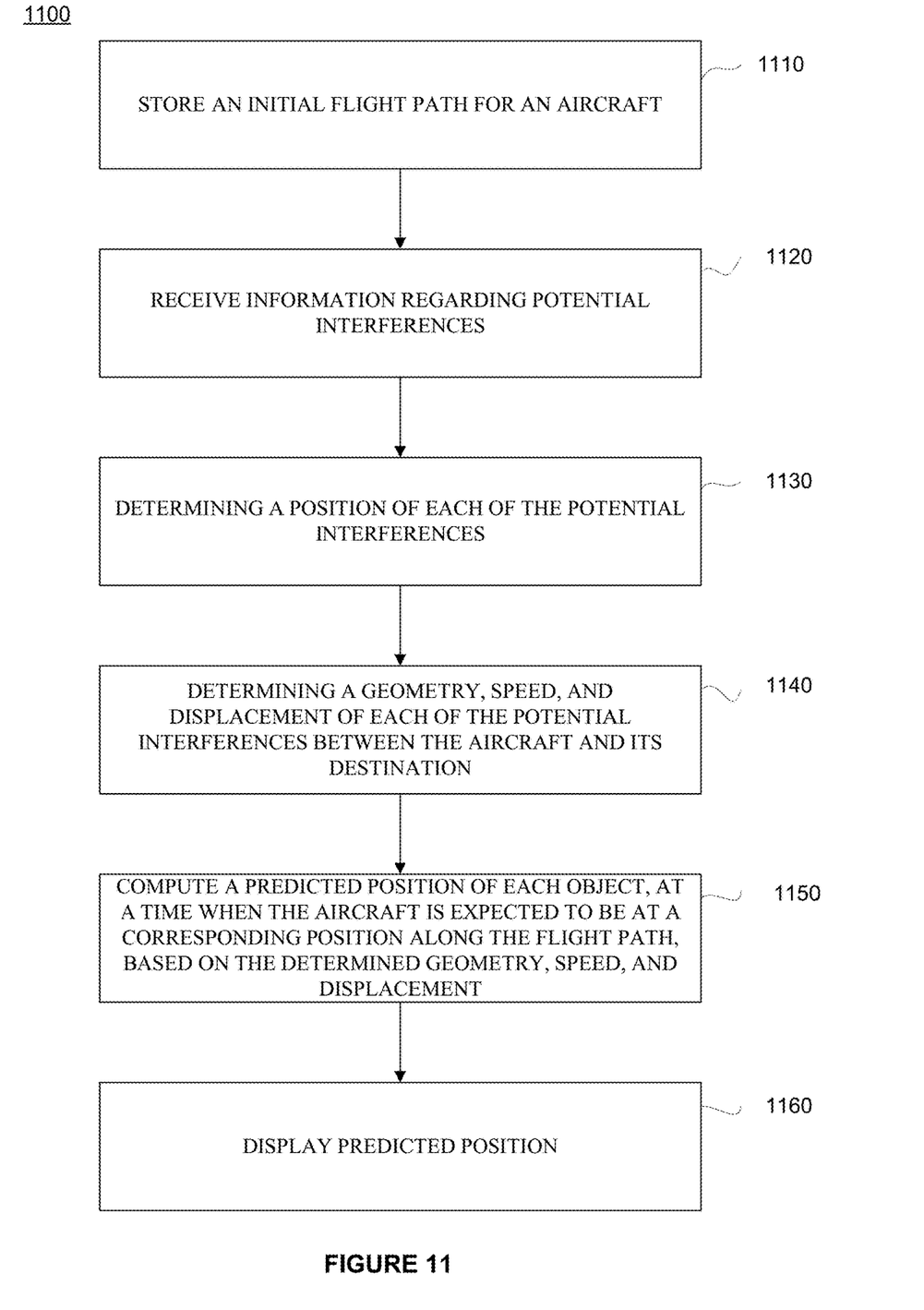
FIG. 11 is a flow diagram illustrating an example method according to aspects of the disclosure.

FIG. 11 is a flow diagram illustrating an example method. The method may be performed, for example, by an aircraft collision avoidance system. While the steps of the method are illustrated in the figure and described below in a particular order, it should be understood that a sequence of the steps may be modified and some steps may be performed in parallel. Moreover, steps may be added or omitted.

In block 1110, an initial flight plan for an aircraft may be stored in memory. The initial flight plan may include, for example, a path of travel, a time (e.g., times of departure, arrival, etc.), and a speed of the aircraft.

In block 1120, information regarding potential interferences is received. Such information may be received from one or more information sources, such as weather radar, weather uplink, TCAS, ADS-B, or any of a number of other resources providing information regarding potential objects or other hazards in a flight path of the aircraft. According to some examples, the information from the resources may be cross-correlated. Such information may be stored, such as temporarily in a buffer. In some examples the information may be stored in association with a confidence value determined based on the cross-correlation or other factors.

In block 1130, a position of each of the potential interferences is determined. For example, the position may be determined based on the information received from the information sources in block 1120.

In block 1140, a geometry, speed, and displacement of each of the potential interferences is determined. Such information may in some instances be received from the information sources. Alternatively or additionally, such information may be computed, for example, by analysis of the potential interferences. In some examples, such computations may be limited, for example, to potential interferences between a position of the aircraft and its destination. In other examples, such computations may be limited to potential interferences appearing within a display range of a display screen. Such display range may be modified by a user. The geometry of the potential interference may be defined by a plurality of vertices. A speed and displacement of those vertices may be analyzed over a sample period of time.

In block 1150, a predicted position of each potential interference is computed for a time when the aircraft is expected to be at a corresponding position along the flight path. The predicted position is computed based on the determined geometry, speed, and displacement of the potential interference. For example, displacement and deformation of the potential interference may be extrapolated as a function of time on the basis of the position and the current speed of the vertices, over a time horizon corresponding to the ratio between the range selected on the screens and the current speed of the aircraft (R/V). For each instant t, the intersection of a circular arc $r_i$ centred on the aircraft ($r_i$=V× t), V being the current speed of the aircraft, with the extrapolation of the potential interferences is computed. By varying the time continuously from 0 to R/V, R being the display range of the screen and V the speed of the aircraft, the various intersections may be summed.

In block 1160, the predicted positions of the potential interferences, relative to the aircraft's position, is displayed. In some examples, multiple display screens may portray such information in various ways. For example, a first display screen may depict a graphic illustrating a flight plan from departure to arrival and depicting the potential interferences at positions where they are predicted to be when the aircraft will be at a corresponding position along the flight path. A second display screen may depict a current or real-time position of the potential interferences in relation to the aircraft.

In some examples, the initial flight plan stored in block 1110 may be updated based on the predicted positions computed in block 1150. For example, a new speed of the aircraft and/or direction of travel may be computed to avoid the potential interferences when it is determined that such interferences would present a hazard. The initial flight plan may be automatically updated with the new speed and/or direction of travel.

The systems and methods described above are advantageous in that provide for displaying precise information to pilots indicating how potential obstacles in the flight path will move over time and affect travel of the aircraft. Such information enables pilots to avoid potentially hazardous conditions, such as collisions, thereby improving the safety of the aircraft. Systems within the aircraft may also operate more efficiently. For example, by updating a flight path at an outset of a flight based on the predicted movements of the interferences, alternate routes are computed early on, saving time, fuel, and other resources.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An aircraft collision avoidance system, comprising:
a display;
one or more inputs adapted to receive interference information;
a memory storing an initial flight plan, the initial flight plan including a flight path and an associated time period;
one or more processors in communication with the display, the one or more processors being configured to:
receive interference information from one or more information systems, the interference information identifying objects between an aircraft and its destination;
determine a position of each of the identified objects at a first time;

determine a geometry of each of the objects between the aircraft and its destination;

determine a speed and displacement of each of the objects;

compute a predicted position of each object at a second time later than the first time based on the determined geometry, speed, and displacement, wherein the second time corresponds to a time when the aircraft is expected to be at a particular position along the initial flight path; and output to the display an indication of the predicted position of each object at the second time.

2. The system of claim 1, wherein the one or more information systems include at least one of a weather radar, a weather uplink, a traffic collision avoidance system (TCAS), or an automatic dependent surveillance-broadcast (ADS-B).

3. The system of claim 1, wherein the geometry of each object includes a plurality of vertices, and wherein determining the speed and displacement of each object includes determining a speed and displacement of each of the plurality of vertices.

4. The system of claim 3, wherein determining the speed and displacement of each of the plurality of vertices is performed over a time horizon corresponding to a ratio between a range selected on the display and a current speed of the aircraft.

5. The system of claim 4, wherein computing the predicted position comprises calculating at each instant t in the time horizon an intersection of a circular arc centered on the aircraft with the determined displacement of each object.

6. The system of claim 1, wherein outputting to the display the indication of the predicted position of each object comprises outputting a graphic illustrating predicted movement of the objects over time in relation to the flight path.

7. The system of claim 1, wherein the display comprises one or more display areas, a first display area displaying the predicted position of each object at the second time, and a second display area displaying a real-time position of each object.

8. The system of claim 1, wherein the one or more processors are further configured to determine, based on the computed prediction position of each object at the second time, whether any of the objects will create a hazardous condition for the aircraft.

9. The system of claim 8, wherein the one or more processors are further configured to automatically modify the initial flight plan based on the computed predicted position of each object at the second later time when it is determined that an object will create a hazardous condition.

10. The system of claim 8, wherein the one or more processors are further configured to update the display to generate a warning when it is determined that an object will create a hazardous condition.

11. A method for avoiding collision of an aircraft, comprising:

storing an initial flight plan, the initial flight plan including a flight path and an associated time period;

receiving interference information from one or more information systems, the interference information identifying objects between the aircraft and its destination;

determining, with one or more processors, a position of each of the identified objects at a first time;

determining, with the one or more processors, a geometry of each of the objects between the aircraft and its destination;

determining, with the one or more processors, a speed and displacement of each of the objects;

computing, with the one or more processors, a predicted position of each object at a second time later than the first time based on the determined geometry, speed, and displacement, wherein the second time corresponds to a time when the aircraft is expected to be at a particular position along the initial flight path; and displaying an indication of the predicted position of each object at the second time.

12. The method of claim 11, wherein the one or more information systems include at least one of a weather radar, a weather uplink, a traffic collision avoidance system (TCAS), or an automatic dependent surveillance-broadcast (ADS-B).

13. The method of claim 11, wherein the geometry of each object includes a plurality of vertices, and wherein determining the speed and displacement of each object includes determining a speed and displacement of each of the plurality of vertices.

14. The method of claim 13, wherein determining the speed and displacement of each of the plurality of vertices is performed over a time horizon corresponding to a ratio between a range selected on the display and a current speed of the aircraft.

15. The method of claim 14, wherein computing the predicted position comprises calculating at each instant t in the time horizon an intersection of a circular arc centered on the aircraft with the determined displacement of each object.

16. The method of claim 11, wherein outputting to the display the indication of the predicted position of each object comprises outputting a graphic illustrating predicted movement of the objects over time in relation to the flight path.

17. The method of claim 11, wherein displaying the indication of the predicted position of each object at the second time further comprises displaying a real-time position of each object, wherein the real-time position is distinguishable from the predicted position.

18. The method of claim 11, wherein the one or more processors are further configured to determine, based on the computed prediction position of each object at the second time, whether any of the objects will create a hazardous condition for the aircraft.

19. The method of claim 18, further comprising automatically modifying the initial flight plan based on the computed predicted position of each object at the second later time when it is determined that an object will create a hazardous condition.

20. The method of claim 18, further comprising updating the display to generate a warning when it is determined that an object will create a hazardous condition.

21. A non-transitory computer-readable medium storing instructions executable by a processor for performing a method of avoiding collision of an aircraft, the instructions comprising:

receiving interference information from one or more information systems, the interference information identifying objects between the aircraft and its destination;

determining a position of each of the identified objects at a first time;

determining a geometry of each of the objects between the aircraft and its destination;

determining a speed and displacement of each of the objects;

computing a predicted position of each object at a second time later than the first time based on the determined geometry, speed, and displacement, wherein the second time corresponds to a time when the aircraft is expected to be at a particular position along an initial flight path; and providing an indication of the predicted position of each object at the second time for display.

\* \* \* \* \*